United States Patent
Wang et al.

(10) Patent No.: US 11,809,271 B1
(45) Date of Patent: Nov. 7, 2023

(54) SYSTEM AND METHOD FOR IDENTIFYING ANOMALIES IN DATA LOGS USING CONTEXT-BASED ANALYSIS

(71) Applicant: Dell Products L.P., Round Rock, TX (US)

(72) Inventors: Dale Wang, Hayward, CA (US); Min Gong, Shanghai (CN); Ashok Narayanan Potti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/153,462

(22) Filed: Jan. 12, 2023

(51) Int. Cl.
  *G06F 11/07*  (2006.01)
  *G06F 11/00*  (2006.01)

(52) U.S. Cl.
  CPC ........ *G06F 11/0793* (2013.01); *G06F 11/008* (2013.01); *G06F 11/0709* (2013.01)

(58) Field of Classification Search
  CPC .. G06F 11/008; G06F 11/0709; G06F 11/079; G06F 11/0793
  See application file for complete search history.

(56) References Cited

U.S. PATENT DOCUMENTS

| | | | |
|---|---|---|---|
| 8,538,897 B2 * | 9/2013 | Han | G06F 11/3447 714/37 |
| 10,572,329 B2 | 2/2020 | Harutyunyan et al. | |
| 10,776,196 B2 * | 9/2020 | Ohana | G06F 11/0709 |
| 11,513,930 B2 * | 11/2022 | Chan | G06F 11/3476 |
| 2019/0095313 A1 * | 3/2019 | Xu | G06F 17/18 |
| 2021/0027205 A1 * | 1/2021 | Sevakula | G06F 11/3447 |
| 2022/0283890 A1 | 9/2022 | Chopra et al. | |
| 2022/0358005 A1 | 11/2022 | Saha et al. | |

* cited by examiner

*Primary Examiner* — Joseph R Kudirka
(74) *Attorney, Agent, or Firm* — Womble Bond Dickinson (US) LLP

(57) ABSTRACT

Methods and systems for managing data processing systems based on indications of anomalous behaviors in logs are disclosed. A data processing system may include and depend on the operation of hardware and/or software components. To manage the operation of the data processing system, a data processing system manager may obtain logs for components of the data processing system that reflect the historical and/or current operation of these components. The logs may be used to identify the operational state of the data processing system, improving the context of the log information. Based on the identified state, inference models may be implemented to predict future infrastructure issues by detecting anomalous behaviors of the data processing system (e.g., behaviors that are unusual for the given state) recorded in the logs. Based on the predictions, the data processing system manager may take action to reduce the likelihood of the data processing system becoming impaired.

20 Claims, 6 Drawing Sheets

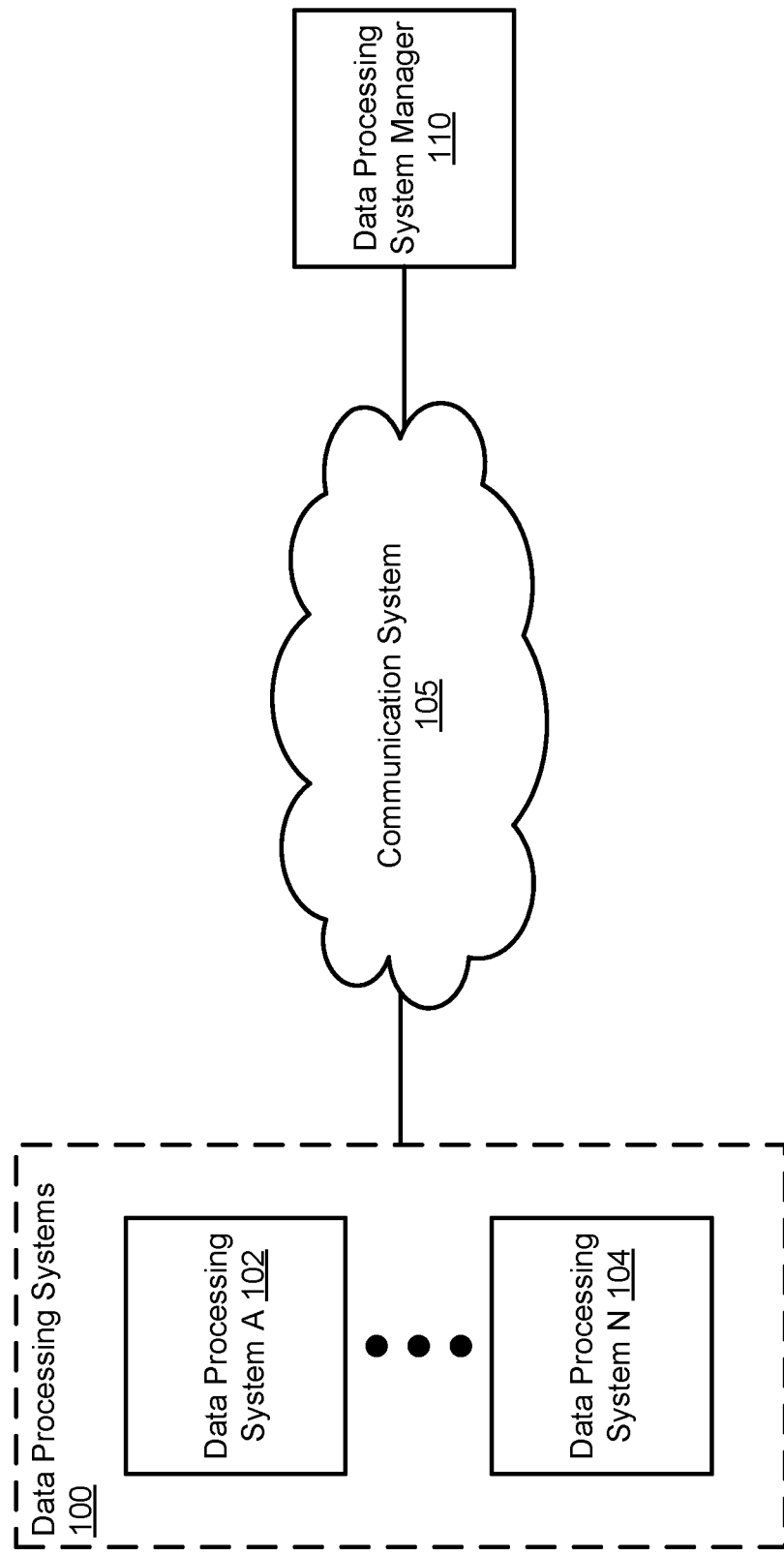

US 11,809,271 B1

SYSTEM AND METHOD FOR IDENTIFYING ANOMALIES IN DATA LOGS USING CONTEXT-BASED ANALYSIS

FIELD

Embodiments disclosed herein relate generally to device management. More particularly, embodiments disclosed herein relate to systems and methods to manage the operation of devices through log analysis.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a block diagram illustrating a system in accordance with an embodiment.

DETAILED DESCRIPTION

Figure 2A:
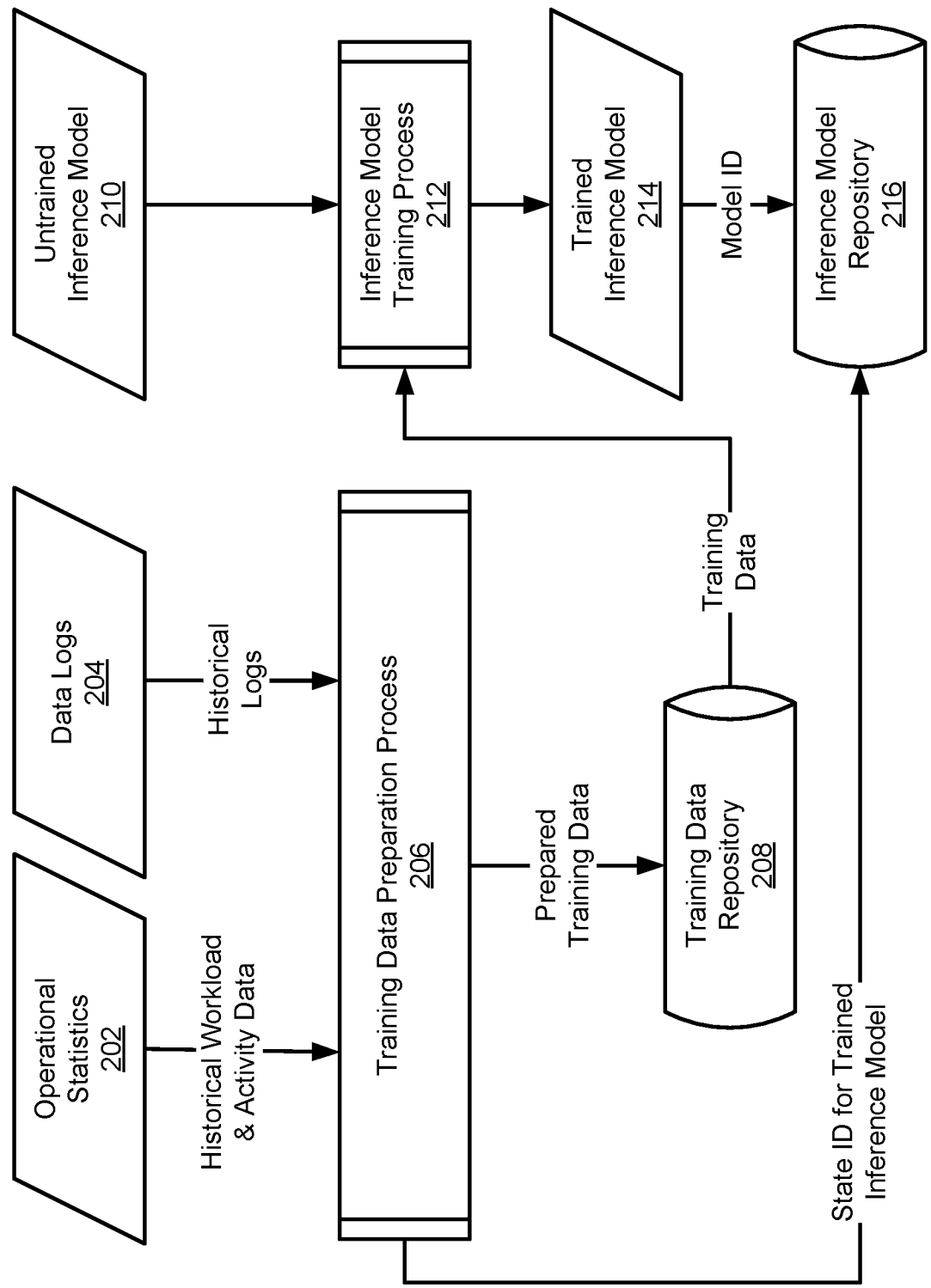
FIG. 2A shows a data flow diagram illustrating a process of obtaining a trained inference model in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems based on indications of anomalous behaviors. A data processing system may include one or more hardware and/or software components. The operation of the data processing system may depend on the operation of these components. For example, improper operation of any of these components may impair (e.g., reduce performance, reduce functionality, etc.) the operation of the data processing system.

To manage the operation of the data processing system, the system may include a data processing system manager. The data processing system manager may obtain logs (e.g., unstructured logs such as system logs and/or resource logs) for data processing systems reflecting the historical operation of these data processing systems and may analyze the logs to predict the future operation of the data processing system (e.g., to detect anomalies within the logs that may indicate a future undesired operation of the data processing system), and/or to provide other functions.

To perform anomaly detection within logs, log messages from unstructured logs may be analyzed using machine learning to obtain neural network inference models. The inference models may ingest large amounts of log data to identify anomalies within a log (e.g., words that occur at lower frequencies than other words within the log). However, due to a lack of context, a log message that is rare (e.g., anomalous with respect to all log messages) may not be indicative of a future undesired operation taking place in all contexts. Consequently, identifying a log message as anomalous may not also be helpful for identifying related system infrastructure issues.

To improve the predictive power of anomalous log messages, context to log messages may be introduced. Thus, log messages may only be identified as anomalous (e.g., unusual and/or abnormal occurrences of log messages, or combinations and/or sequences thereof) if anomalous with respect to log messages having similar context. By doing so, log messages identified as being anomalous in this manner may improve (i) the troubleshooting of system infrastructure issues, and/or (ii) the determination of remedial actions to mitigate and/or prevent future issues. To do so, the data processing system manager may use activity data and/or operational workload data extracted from the obtained logs and/or other data sources to define various operational states of a data processing system. These operational states may be used to contextualize different log messages thereby allowing log messages having similar contexts to be identified.

An inference model may be trained to recognize anomalous log segments (e.g., portions of the log, such as a sequence of log messages) for a specific operational state of the data processing system. These anomalous log segments may be used to perform real-time troubleshooting (e.g., for real-time supplied log data) to identify the causes of potential undesired operation of the data processing system. Action sets may then be identified and may be implemented for remediating and/or preventing current infrastructural issues or similar issues that may be encountered in the future.

By doing so, an improved computing device and/or distributed system may be obtained. The improved device and/or system may have higher uptime and/or may be more resilient to impairment.

In an embodiment, a computer-implemented method for managing data processing systems based on indications of anomalous behaviors is provided. The method may include: obtaining a new log for a data processing system of the data processing systems; obtaining operational statistics for the data processing system based on the new log; identifying a state of the data processing system based on the operational statistics; and obtaining a trained inference model based on the state of the data processing system.

The method may also include ingesting at least a portion of the new log to the trained inference model to obtain a classification for the new log, the classification indicating whether the portion of the new log includes an anomalous log segment, and in a first instance of the classification where the new log includes the anomalous log segment, initiating performance of a remediation action set to manage an impact of a potential undesired operation of the data processing system, the remediation action set being based on the anomalous log segment.

Obtaining the operational statistics may include identifying a time period based on a first timestamp and a second timestamp from the new log, and obtaining the operational statistics for the time period from an operational statistics log for the data processing system.

The operational statistics may include: workload data including hardware performance statistics, the workload data being a part of the operational statistics log; and activity data including software performance statistics, the activity data being a part of the operational statistics log.

Identifying the state may include performing a lookup based on the workload data and the activity data, the lookup returning the state.

Obtaining the trained inference model may include identifying an association between the state and the trained inference model, the association being based on a previous state of the data processing system associated with training data on which the trained inference model is based. The state and the previous state may be a same state.

The trained inference model may be based exclusively on training data obtained from the data processing systems while the data processing systems were in the state.

The trained inference model may be a member of a plurality of trained inference models, and each of the plurality of trained inference models being trained using a subset of a corpus of training data, the subset of the corpus of training data being discriminated from a remainder of the corpus of training data based on being associated with the state, and the remainder of the corpus of the training data being associated with a different state from the state.

Presence of the anomalous log segment in the portion of the new log may be treated as indicating that a future undesired operation of the data processing system is likely to occur.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the process.

Turning to FIG. 1, a block diagram illustrating a system in accordance with an embodiment is shown. The system shown in FIG. 1 may provide computer implemented services. The system may include data processing systems 100. Data processing systems 100 may include any number of computing devices that provide the computer implemented services. For example, data processing systems 100 may include one or more data processing systems 102, 104 that may independently and/or cooperatively provide the computer implemented services.

For example, all, or a portion, of data processing systems 102-104 may provide computer implemented services to users and/or other computing devices operably connected to data processing systems 100. The computer implemented services may include any type and quantity of services including, for example, database services, instant messaging services, video conferencing services, etc. Different systems may provide similar and/or different computer implemented services.

To provide the computer implemented services, data processing systems 100 may host applications that provide these (and/or other) computer implemented services. The applications may be hosted by one or more of data processing systems 100.

Any of data processing systems 102-104, and components thereof, as well as hosted entities (e.g., applications that provide computer implemented services, other applications that manage the operation of data processing systems 100, etc.), may be subject to undesired operation. For example, due to various operating conditions, flaws in design, and/or for other reasons, any of these hardware and/or software components may operate in a manner that diverges from nominal (e.g., desired) operation.

When operating, any of these components may generate one or more logs. A log may be a data structure that includes operational information regarding data processing systems 100 such as, for example, descriptions of conditions encountered by a component, a time when the condition was encountered, an identifier associated with a condition and/or generator of the log, an indication of a relative level of importance or severity of the encountered conditions, and/or other types of information. While the logs may include information regarding the current operation of data processing systems 100, the logs may not specify whether portions of the log (e.g., log segments) are indicative of potential undesired operation of the data processing systems 100 and/or components thereof, and/or may lack other information that may be used to manage data processing systems 100. Rather, the logs may generally include a representation of current and/or past operation of all or a portion of data processing systems 100. Thus, the logs alone may not be useful for proactively addressing potential future undesirable operating conditions of data processing systems 100, and/or causes (e.g., root causes) of the potential undesired operation of data processing systems 100.

In general, embodiments disclosed herein may provide systems, devices, and methods for managing data processing systems to reduce the likelihood of the data processing systems operating in an undesired manner by identifying anomalous behavior from data processing system logs. A system in accordance with an embodiment may include data processing system manager 110. Data processing system manager 110 may manage the operation of data processing systems 100.

To provide its functionality, data processing system manager 110 may (i) obtain logs for the hardware and/or software components of data processing systems 100 (e.g., workload and/or activity data), (ii) obtain the states of the data processing systems (e.g., generated by a state recognition process using workload and/or activity information), (iii) utilize one or more trained inference models to detect anomalous behavior (e.g., anomalous log segments) occurring on one or more data processing systems for one or more states, and/or (iv) initiate performance of one or more actions (e.g., an "action set") to remediate undesirable operation and/or reduce the likelihood of data processing systems 100 operating in an undesirable manner in the future.

By doing so, a system in accordance with embodiments disclosed herein may provide data processing systems having, for example, (i) decreased downtime (e.g., downtime due to hardware failure), (ii) improved user experiences by avoiding phantom slowdowns and/or pauses (e.g., due to undesired operating behavior), and/or (iii) improve computing resource availability for desired computer implemented services by reducing computing resource expenditures for management and/or remedial action.

Figure 3:
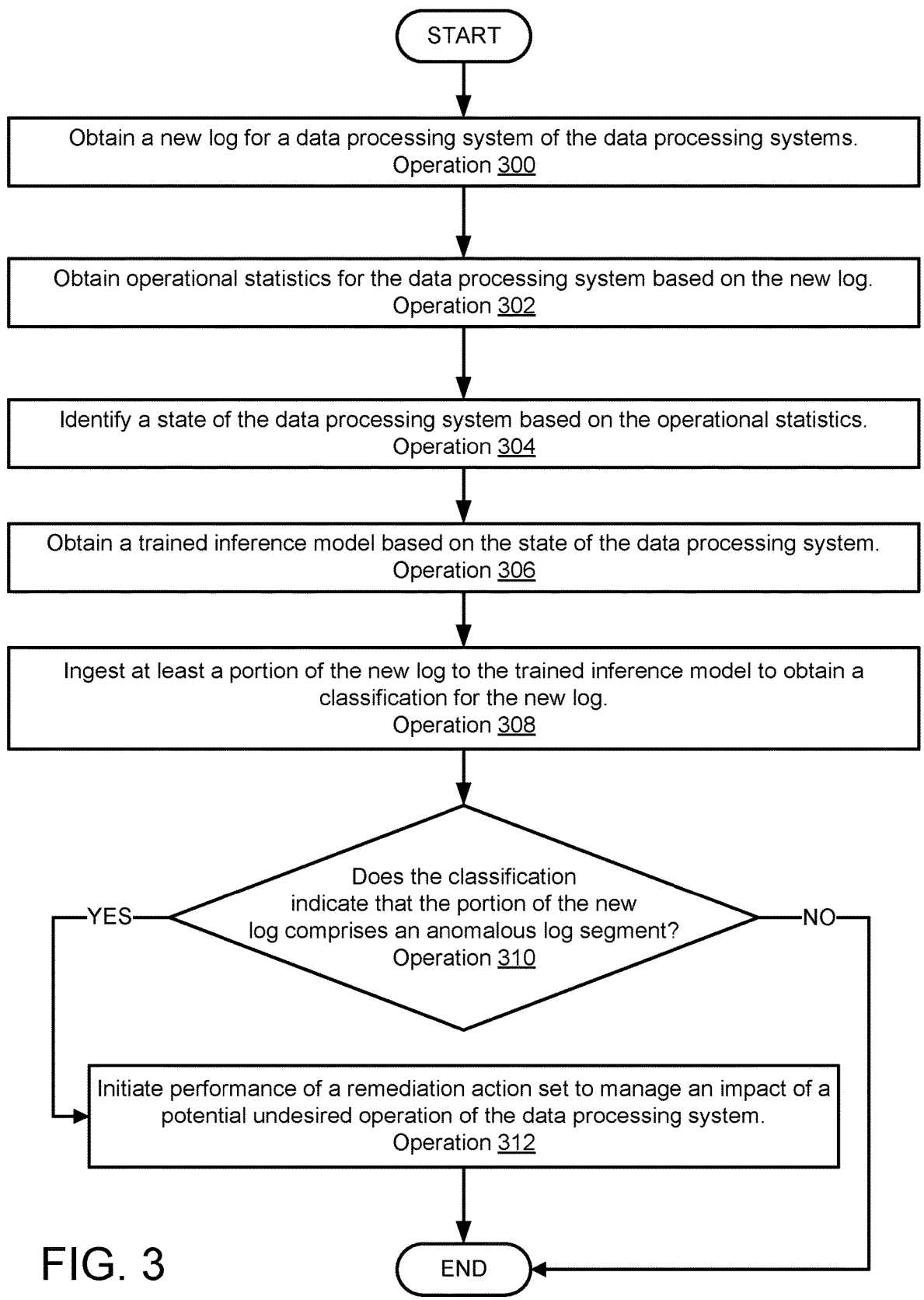
FIG. 3 shows a flow diagram illustrating a method of detecting an anomalous log segment in accordance with an embodiment.

When providing its functionality, data processing system manager 110 may perform all, or a portion, of the method and/or actions shown in FIG. 3.

Data processing systems 100 and/or data processing system manager 110 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 4.

Any of the components illustrated in FIG. 1 may be operably connected to each other (and/or components not illustrated) with a communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Turning to FIG. 2A, a data flow diagram in accordance with an embodiment is shown. The data flow diagram may illustrate the generation of inference models in a system similar to that of FIG. 1. The inference models may provide computer-implemented services (e.g., inference generation) for downstream consumers. A data processing system may, over time, generate inference models for various purposes. For example, inference models may generate inferences that may be used to recognize patterns, automate tasks, and/or make decisions.

The inference models may, for example, be implemented with artificial neural networks, decision trees, support-vector machines, regression analysis, Bayesian networks, genetic algorithms, and/or any other type of model usable for learning purposes. The type of inference model used may depend on the goals of the downstream consumers and/or other factors such as (i) training dataset characteristics (e.g., data type, size and/or complexity), (ii) cost limitations (e.g., the cost to train and/or maintain the inference model), (iii) time limitations (e.g., the time to train the inference model and/or for inference generation), and/or (iv) inference characteristics (e.g., accuracy and/or inference type).

For example, a complex inference model such as a multi-layered neural network may process a large amount of complex data and generate highly accurate inferences, but may be costly to train and maintain and may have low explainability (e.g., may act as a "black box"). In contrast, a linear regression model may be a simpler, less costly inference model with high explainability, but may only be well-suited for data whose labels are linearly correlated with the selected features and may generate less accurate inferences than a neural network.

Once an inference model type is selected, the inference model must be trained using training data that may be acquired from various data sources (e.g., various data processing systems). FIG. 2A shows training data gathered from operational statistics 202 and data logs 204. Operational statistics 202 and data logs 204 may be acquired from one or more data processing systems 100.

Data logs 204 may be obtained from any number of data processing systems managed by data processing system manager 110. Data logs 204 may include any type and quantity of logs, and may include descriptions of actions leading up to an event, and/or a description of an event (e.g., an undesirable operation and/or normal operation). Data logs 204 may be implemented with structured or unstructured data and may include any number of past logs (e.g., historical logs). These historical logs may relate to historical information from operational statistics 202 and therefore may be collected over the same time period(s) as data from operational statistics 202.

Operational statistics 202 may include workload data, such as system performance statistics. For example, operational statistics 202 may include statistics that monitor the level of use of hardware components (e.g., a ratio of current capacity to maximum capacity). Operational statistics 202 may include, for example: disk usage, memory usage, CPU usage, input/output traffic, fan speed, and/or any combination of usage that may indicate a system workload level. Operational statistics 202 may also include activity data. Activity data may monitor the use of software components (e.g., job concurrency). Activity data may include: job start and/or end times, job type, job completion statistics, hardware and/or software being utilized by the job, etc.

Training data preparation process 206 may obtain historical workload and/or activity data from operational statistics 202, and/or historical logs from data logs 204. A combination and/or sequence of activity data and/or workload data may be used to define the operational state of the system during a specific time period (refer to FIGS. 2B-2C for details concerning states and state recognition processes). The operational state may be identified using a state ID. The state ID may be associated with the portion of training data (e.g., operational statistics 202 and/or data logs 204) corresponding to the specific time period of the operational state.

Training data preparation process 206 may include verifying and/or performing data labeling (e.g., associating two or more data samples from the collected training data). For example, for a combination of workload and activity data (e.g., state), a portion of operational statistics (e.g., input) may be associated with historical log segments having an abnormal log segment (e.g., output). However, labeled training data may not always be reliable (e.g., a data sample may be improperly labeled by a user) and, if incorrectly labeled training data is used to train an inference model, the trained inference model may generate inaccurate inferences. Thus, the quality of training data labels may be verified as part of training data preparation process 206. For example, unreliable labels may be removed from a portion of training data and that portion of training data may be implemented unlabeled data during training.

The prepared training data from training data preparation process 206 may be stored in training data repository 208. Any of the training data from training data repository 208 may relate data from operational statistics 202 to data from data logs 204, thereby including any portion of labeled data. Training data may also include unlabeled data and, thus, an association between operational statistics 202 and data logs 204 may not be known.

Training data repository 208 may include any number of training datasets associated with any number of state IDs. Training data associated with a particular state ID may be used to train an inference model to generate a prediction (e.g., an inference) regarding the potential future operation of the data processing system in that state, based on ingest data (e.g., data logs 204).

Untrained inference model 210 may be trained using training data (e.g., from training data repository 208). To do so, untrained inference model 210 and the training data may be input to inference model training process 212.

Inference model training process 212 may employ machine learning techniques such as supervised learning (e.g., for labeled training data), and/or unsupervised learning (e.g., for unlabeled data). The trained machine learning models may be implemented using other modalities (e.g., semi-supervised learning, reinforced learning, associative rules, etc.). As part of the training process, the inference model may undergo a validation and/or testing step to improve and/or measure the reliability of generated inferences. Any number of inference models may be trained using inference model training process 212.

Trained inference model 214 may attempt to map an input dataset to a desired output dataset (e.g., generate inferences). The generated inference may include inferences generated based on ingest data that may differ from the training data that was used to train trained inference model 214. For example, trained inference model 214 may be used to analyzing data logs from a data processing system (e.g., data logs recorded during a particular operational state of the data processing system) and may detect anomalous behavior (e.g., anomalous log segments) recorded in the logs.

Trained inference model 214 may be stored in inference model repository 216 along with any number of other inference models (e.g., other trained inference models that are not shown and/or described in FIG. 2A). Each trained inference model may be identified, at least in part, by a model ID and/or its associated state ID (e.g., the state ID associated with training data used to train the inference model). Over time, the trained inference models of inference model repository 216 may need to be updated for a variety of reasons. For example, the trained inference models may become inaccurate, may not provide desired types of inferences, etc. Consequently, the trained inference models of inference model repository 216 may be periodically replaced and/or updated.

Thus, as illustrated in FIG. 2A, the system of FIG. 1 may obtain and/or train inference models used for the detection of anomalous log segments for a given operational state of the data processing system.

Figure 2B:
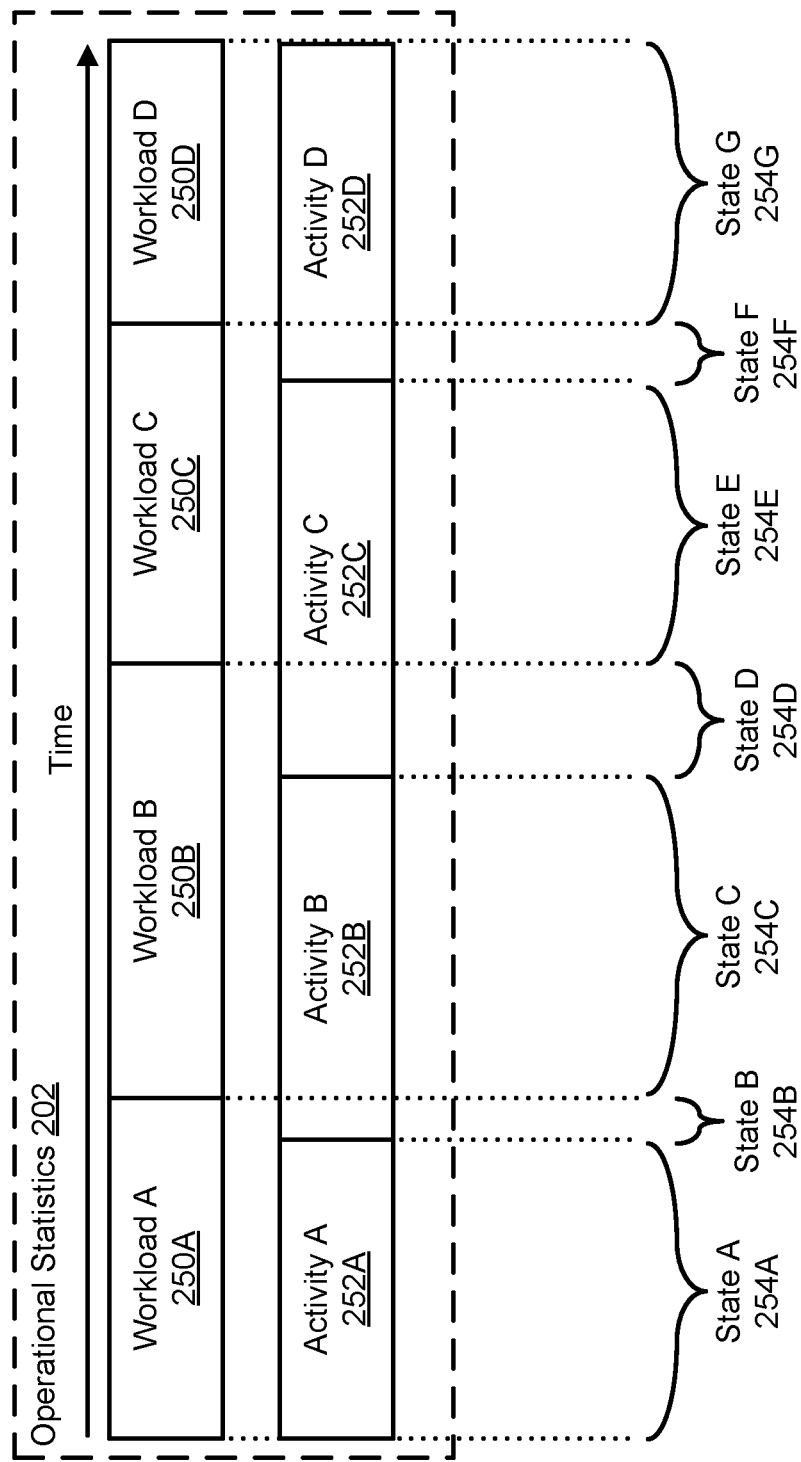
FIG. 2B shows a diagram illustrating operational states of a data processing system in accordance with an embodiment.

FIG. 2B shows a diagram illustrating operational states of a data processing system in accordance with an embodiment. Workload and activity data extracted from operational statistics 202 may be analyzed to determine operational states of a data processing system.

FIG. 2B shows a sequence of workload data (e.g., workload 250A through workload 250D) and a sequence of activity data (e.g., activity 252A through activity 252D) along a horizontal axis representing time. An operational state may be defined by a time period (e.g., using timestamp information from operational statistics 202) and an activity and/or workload data.

Workload profiles may be created by grouping performance statistics of components of a data processing system from operation statistics 202. For example, time periods of intensive memory usage may be grouped with periods of intensive CPU usage. Activity profiles may be created by grouping concurrent jobs (e.g., based on run-time periods). Only some job types may be included (e.g., due to the typically large number of concurrently running jobs) and/or combinations of activities may be merged (e.g., if an activity or activity profile appears with low frequency). An operational state may be defined based on a workload, a workload profile, an activity, and/or an activity profile (and any combination and/or sequence thereof).

For example, in FIG. 2B, state 254A may be defined by activity 252A alone, or by activity 252A and a portion of workload 250A. Similarly, State 254G may be defined by workload 250D alone, or by including a portion of activity 252D. In some cases, states may be combined, such as state 254B and state 254C.

Operational states may be stored in a database keyed to predefined state IDs. The keying may allow for the database to be efficiently searched based on state ID. Various metadata may be associated with each state ID. The metadata may include, for example, associated data processing systems, logs, events (e.g., operations), and/or other information. The database may be implemented using any type of data structure such as, for example, a table, linked list, database, etc. The database may be referenced by processes described with regards to FIG. 2C.

It should be noted that the example shown in FIG. 2B is simplified for the purpose of clarity, and that the operational statistics for a data processing system may include more workload and/or activity data than what is shown in FIG. 2B, which may add more complexity to the operational state definition and/or recognition process.

Figure 2C:
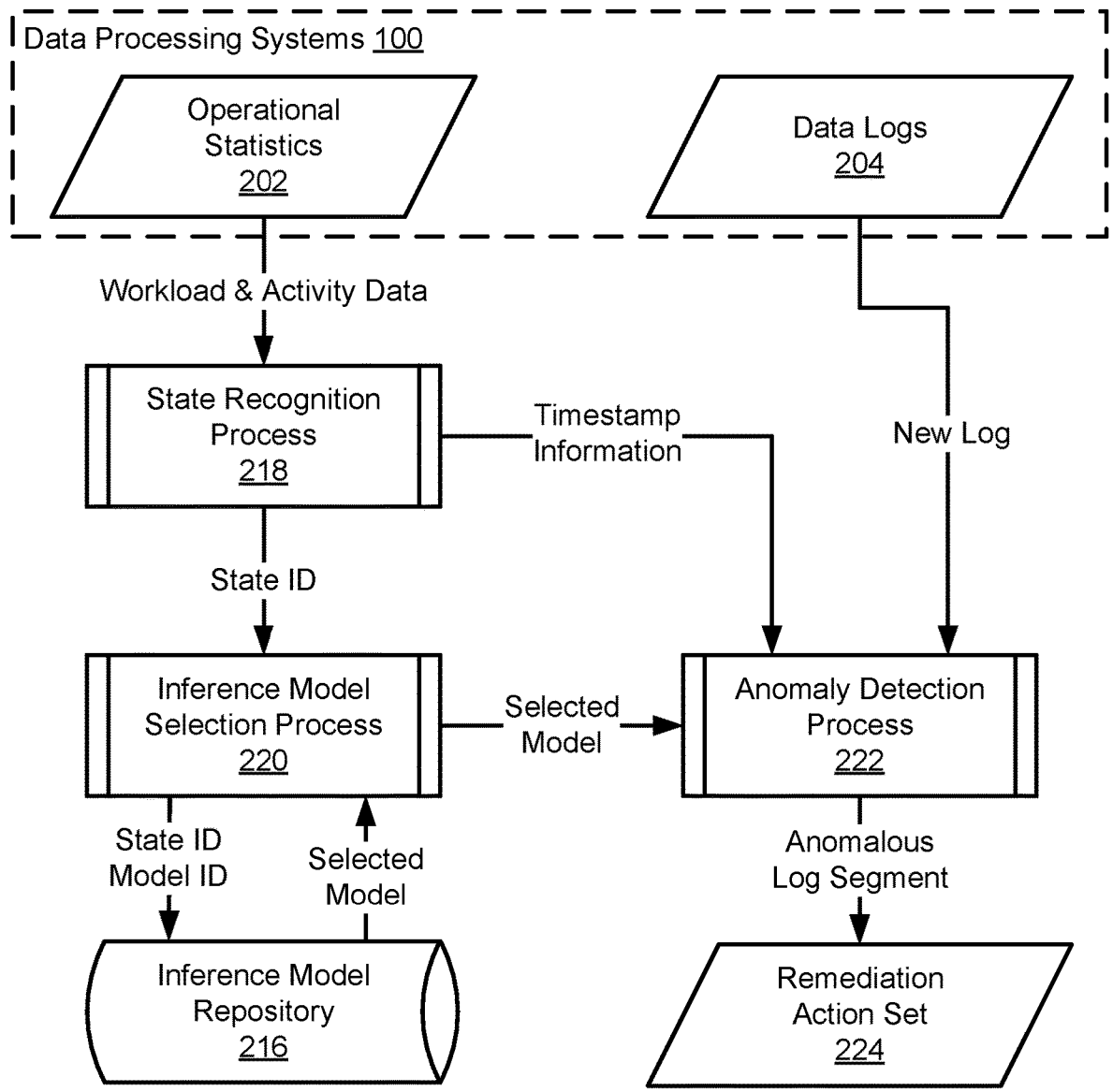
FIG. 2C shows a data flow diagram illustrating a process of detecting an anomalous log segment in accordance with an embodiment.

Turning to FIG. 2C, a data flow diagram illustrating a process of detecting an anomalous log segment in accordance with an embodiment is shown. Data processing systems 100 may generate operational statistics 202 and data logs 204. Data logs 204 may be real-time logs that include information regarding current operations of any component(s) of data processing systems 100. Operational statistics (e.g., real-time workload and/or activity data) may be supplied to state recognition process 218.

State recognition process 218 may use workload data and/or activity data to determine the operational state of one or more data processing systems 100. For example, combinations of workload and/or activity data may be accessed from a database (e.g., a lookup table), each combination being associated with a state ID. State recognition process 218 may obtain timestamps from operational statistics 202, the timestamps defining one or more time periods for which the data processing system was in the recognized state (as discussed with regards to FIG. 2B).

Once the state ID is obtained, an inference model associated with the state ID may be selected during inference model selection process 220. To select an inference model, inference model selection process 220 may query inference model repository 216 using a model ID and/or the state ID from state recognition process 218 to select an inference model that may be used in anomaly detection process 222. Any number of models may be selected, each corresponding to one or more states identified in state recognition process 218.

Once selected, ingest data may be input to the selected inference model as part of anomaly detection process 222. Ingest data may include the new log (e.g., a new log not included in the training data used to train the selected inference model) and/or portions thereof. Anomaly detection process 222 may partition the new log into portions (e.g., log segments) by matching timestamp information stored in the new log with the timestamp information from state recognition process 218. Thus, log segments of the new log may be ingested by the inference model employed in anomaly detection process 222.

Anomaly detection process 222 may identify an anomalous log segment from the ingested new log. The anomalous log segment may be abnormal only in the context of the given operational state. For example, a system reboot message may be commonly found in data logs and therefore may not be detected out of context; however, a system reboot message in a particular operational state (e.g., during a back-up operation) may be an anomaly. The abnormal log segment may be used to troubleshoot current and/or future issues likely to occur, resulting in remediation action set 224.

Remediation action set 224 may be based on the content of the identified abnormal log segment. Remediation actions may include, for example, (i) disabling a function of a data processing system, (ii) transferring a workload from a first data processing system to a second data processing system, (iii) disabling a hardware component of a data processing system, and/or (iv) sending a notification to a user (e.g., administrator) regarding a possible occurrence of an undesired operation of the data processing system.

As discussed above, the components of FIG. 1 may perform methods to detect anomalous log segments in logs generated by data processing systems that provide computer-implemented services. The detection of anomalous log segments within the context of operational states may allow for targeted and efficient anomaly detection, and/or effective remediation strategies.

FIG. 3 shows a flow diagram illustrating a method of detecting an anomalous log segment in accordance with an embodiment. The method may be performed by the system of FIG. 1. Any of the operations described with respect to FIG. 3 may be performed in different orders, skipped, repeated, and/or be performed in a parallel or partially overlapping in time manner.

At operation 300, a new log for a data processing system of the data processing systems 100 may be obtained. The new log may be obtained by (i) receiving the new log from one or more data processing systems (e.g., which may generate and provide the logs in real-time), (ii) reading the new log from storage, and/or (iii) receiving the new log from another device (e.g., from devices which may aggregate logs for other devices). Any quantity of new logs may be obtained. The new log may be obtained via network communications between the data processing system manager and other devices.

The new log may be real-time log (e.g., not a historical log), and may include one or more log segments (e.g., sequences of log messages). The log may include information such as timestamps (e.g., the time of an operation and/or log message), a log message identifier, log message severity (e.g., warning, failure, etc.), log message text, and/or data processing system information. The log may be generated by the data processing system during a specific operational state.

At operation 302, operational statistics for the data processing system may be obtained. The operational statistics may be obtained based on information from the new log (e.g., timestamps usable to identify operation statistics corresponding to different portions of the new log). The new log may have been generated over a time period defined by two or more timestamps recorded in the new log. The operational statistics may be obtained for the time period by (i) receiving the operational statistics from one or more data processing systems (e.g., which may generate operational statistics logs), (ii) reading the operational statistics from storage, and/or (iii) receiving the operational statistics from another device (e.g., via network communications between the data processing system manager and another device). Any quantity of operational statistics may be obtained for the defined time period.

The operational statistics may include information that describe hardware performance statistics (e.g., workload data) over time, such as CPU usage, memory usage, and/or TO traffic. The operational statistics may also include statistics that describe software performance statistics over time (e.g., activity data). The hardware and/or software performance statistics may be captured over a time period (e.g., via timestamps recorded in the operational statistics logs) and may be selected based on a first timestamp and a second timestamp (e.g., to match the time period of the new log obtained in operation 300). The time period may relate to a specific operational state of the data processing system.

At operation 304, a state of the data processing system may be identified. The state of the data processing system may be based on the operational statistics (e.g., workload data and/or activity data). The operational state may be workload-based (e.g., based on hardware performance) or activity-based (e.g., based on job concurrency), and/or a combination of both. For example, the state of the data processing system may be characterized by workload as TO intensive, CPU intensive, memory intensive, high-stress workload, light-weight workload, etc. The data processing system may also be characterized, for example, by activity, by selecting batch job identifiers to determine their run-time periods (e.g., number and/or type of concurrent jobs).

The state may be identified by querying information a database (e.g., performing a lookup) based on the workload data and/or activity data collected in operation 302. The database lookup may return a state ID (refer to FIGS. 2B-2C for details regarding states and the state recognition process). Any number of state IDs may be identified for a given time period. The operational state may be used to provide context for an analysis of the new log obtained in operation 300 using a trained inference model.

At operation 306, a trained inference model may be obtained. The trained inference model may be obtained by (i) reading the trained inference model from storage (e.g., inference model repository 216), (ii) receiving the trained inference model from another device, and/or (iii) generating the trained inference model, for example by programming a data processing system and/or another device.

The trained inference model may be generated by machine learning using training data (e.g., historical operational statistics and/or historical data logs). The training data used to train the inference model may be associated with a particular state ID of a data processing system (e.g., the trained inference model may be associated with the particular state ID). For example, the training data may be historical log data that belongs to a time period associated with a state ID that is the same as the particular state ID.

The training data used to train the trained inference model may be obtained exclusively from data processing systems operating in the state that is associated with the trained inference model. Multiple inference models may be trained, each using subsets of a corpus of training data, where each subset of training data is associated with a different state.

The training data may establish relationships between operational statistics and log data preceding an operation and the operation (e.g., labeled data). For example, a data processing system administrator may employ troubleshooting tools that generate troubleshooting records. The data from troubleshooting records may be used to label the training dataset (e.g., reported problems and their associated resolution records). The relationships (e.g., labeled data) may be used to train the inference model using supervised learning (e.g., using a classification model). However, if labeled data is unavailable and/or if data labels are unreliable, the inference model may be trained using unsupervised learning (e.g., using outlier detection methods).

The trained inference model (e.g., associated with a state) may be used to classify new logs obtained from the data processing system while operating in the same state.

At operation 308, at least a portion of the new log may be ingested to the trained inference model to obtain a classification for the new log. The portion may be ingested to the trained inference model by feeding the new log to the trained inference model (e.g., the portion may be treated as one unit of ingest data). The portion of the new log may be a log segment (e.g., one or more log messages) and may be based on a time period. More than one portion of the new log may be fed to the inference model at different times, and/or each portion of the new log may be a different length.

The trained inference model may detect anomalous segments within a log portion (e.g., the inference model may perform anomaly detection process 222 from FIG. 2C). to obtain the classification. The classification may be based on combinations and/or sequences of log messages within the log segment.

If all portions of the new log include expected log messages (e.g., within the context of a given state), then the new log may be classified as normal. However, if a portion of the new log includes an unexpected log message (e.g., within the context of the given state), the portion of the new log may be classified as abnormal. The abnormal portion of the new log may include an abnormal log segment.

At operation 310, a determination is made regarding whether the portion of the new log includes an anomalous log segment. The determination may be made based on the classification obtained in operation 308. If the portion of the new log is classified as normal, the classification may not indicate that the new log includes an abnormal log segment. Otherwise, if the portion of the new log is classified as abnormal, the classification may indicate that the new log includes an anomalous log segment, and that the data processing system may experience a future undesired operation.

If it is determined that the classification indicates that the new log includes an anomalous log segment, the method may proceed to operation 312. Otherwise, the method may end following operation 310.

At operation 312, in a first instance of the classification where the new log comprises the anomalous log segment, performance of a remediation action set may be initiated to manage an impact of a potential undesired operation of the data processing system. Performance of the remediation action set may be initiated by implementing remediation actions such as (i) notifying an administrator a potential future undesired operation (e.g., associated with the abnormal log segment), (ii) performing a reconfiguration of a data processing system based on the potential future undesired operation, (iii) transferring workloads from the data processing system to other data processing systems, (iv) disabling a function of a data processing system, (v) disabling a hardware and/or software component of the data processing system, and/or (vi) performing other actions that may reduce the likelihood of the data processing system being impaired in the future (e.g., to avoid the potential future undesired operation), allow administrators or other persons to locate the potential source and/or time of initiation of an issue that may lead to the potential future undesired operation, and/or for other purposes.

The method may end following operation 312.

Thus, as illustrated above, embodiments disclosed herein may provide systems and methods usable to manage data processing systems based on indications of anomalous behaviors recorded in logs. By utilizing trained inference models to analyze log segments obtained from data processing systems, future undesired operations of the data processing systems may be anticipated and mitigated.

Thus, embodiments disclosed herein may provide an improved computing device that is able to extract useful information from unstructured log data, usable for management purposes. Further, the disclosed process may facilitate identification of relationships that a person may easily overlook. Accordingly, the disclosed process provides for both an embodiment in computing technology and an improved method for device management. Rather than relying on a person's intuition or expert knowledge, an automated process for analysis may be provided.

Figure 4:
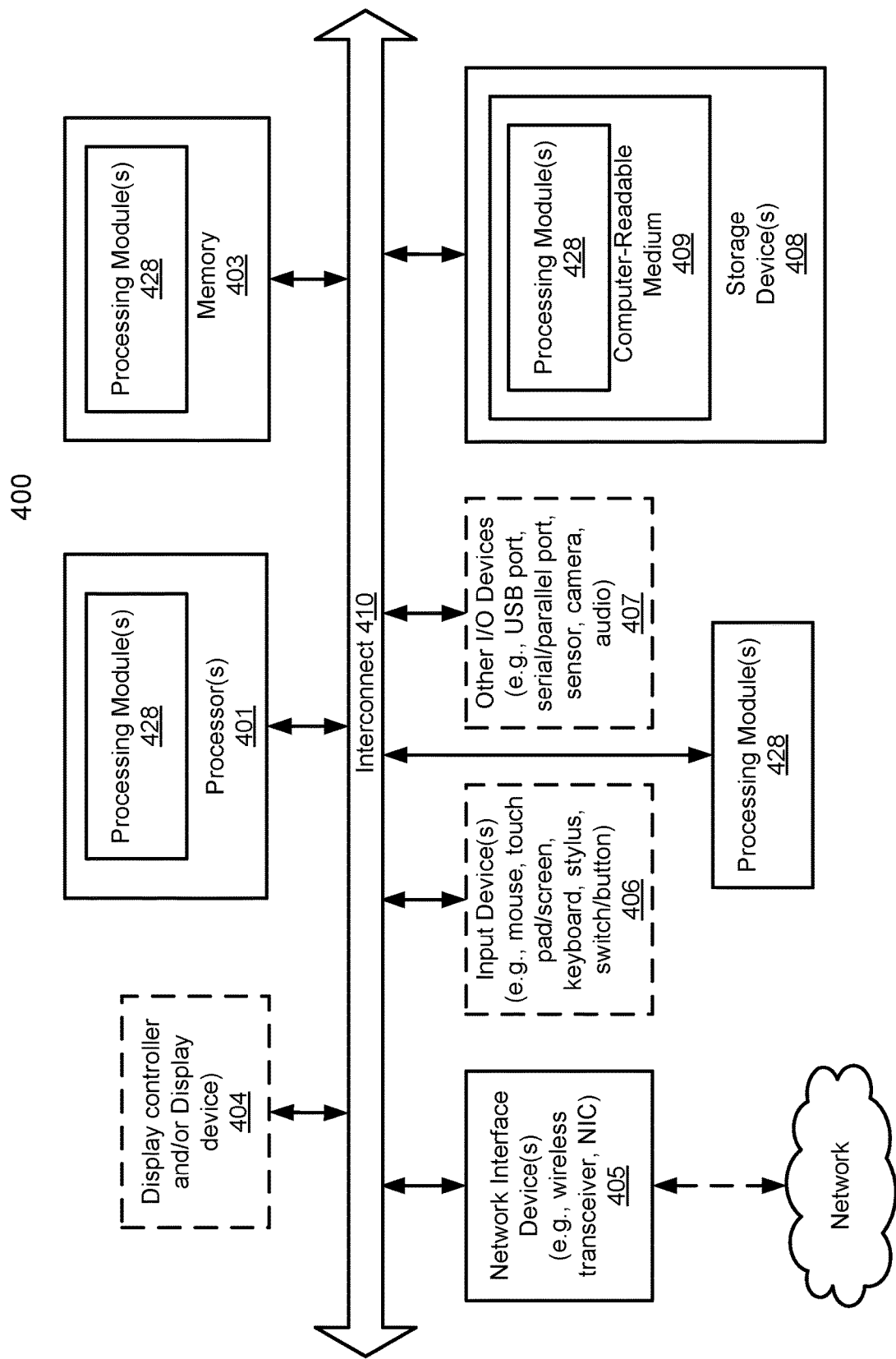
FIG. 4 shows a block diagram illustrating a data processing system in accordance with an embodiment.

Any of the components illustrated in FIGS. 1-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets.

Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OV/iOS® from Apple, Android® from Google®, Linux®, Unix®, or other real-time or embedded operating systems such as VxWorks.

System 400 may further include 10 devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data processing systems based on indications of anomalous behaviors, comprising:
    obtaining a new log for a data processing system of the data processing systems;
    obtaining operational statistics for the data processing system based on the new log, the operational statistics indicating a level of intensity of a workload of the data processing system over a period of time;
    identifying a state of the data processing system based on the operational statistics;
    obtaining a trained inference model based on the state of the data processing system;
    ingesting at least a portion of the new log to the trained inference model to obtain a classification for the new log, the classification indicating whether the portion of the new log comprises an anomalous log segment; and
    in a first instance of the classification where the new log comprises the anomalous log segment:
        executing a remediation action set to manage an impact of a potential undesired operation of the data processing system, the remediation action set being based on the anomalous log segment and comprising at least one action selected from a group consisting of: (i) disabling a function of the data processing system, (ii) transferring the workload to another data processing system of the data processing systems, and (iii) disabling a hardware component of the data processing system,
    wherein obtaining the operational statistics comprises:
        identifying a time period based on a first timestamp and a second timestamp from the new log; and
        obtaining the operational statistics for the time period from an operational statistics log for the data processing system.

2. The method of claim 1, wherein the operational statistics comprise:
    workload data comprising hardware performance statistics, the workload data being a part of the operational statistics log; and
    activity data comprising software performance statistics, the activity data being a part of the operational statistics log.

3. The method of claim 2, wherein identifying the state comprises:
    performing a lookup based on the workload data and the activity data, the lookup returning the state.

4. The method of claim 3, wherein obtaining the trained inference model comprises:
    identifying an association between the state and the trained inference model, the association being based on a previous state of the data processing system associated with training data on which the trained inference model is based.

5. The method of claim 4, wherein the state and the previous state are a same state.

6. The method of claim 1, wherein the trained inference model is based exclusively on training data obtained from the data processing systems while the data processing systems were in the state.

7. The method of claim 1, wherein the trained inference model is a member of a plurality of trained inference models, and each of the plurality of trained inference models being trained using a subset of a corpus of training data, the subset of the corpus of the training data being discriminated from a remainder of the corpus of the training data based on being associated with the state, the remainder of the corpus of the training data being associated with a different state from the state, and the state indicating the level of the intensity of the workload and types of activities performed by the data processing system during the workload.

8. The method of claim 1, wherein a presence of the anomalous log segment in the portion of the new log is treated as indicating that a future undesired operation of the data processing system is likely to occur.

9. A non-transitory machine-readable medium having instructions stored therein, which when executed by a processor, cause the processor to perform operations for managing data processing systems based on indications of anomalous behaviors, the operations comprising:
 obtaining a new log for a data processing system of the data processing systems;
 obtaining operational statistics for the data processing system based on the new log;
 identifying a state of the data processing system based on the operational statistics, the operational statistics indicating a level of intensity of a workload of the data processing system over a period of time;
 obtaining a trained inference model based on the state of the data processing system;
 ingesting at least a portion of the new log to the trained inference model to obtain a classification for the new log, the classification indicating whether the portion of the new log comprises an anomalous log segment; and
 in a first instance of the classification where the new log comprises the anomalous log segment:
  executing a remediation action set to manage an impact of a potential undesired operation of the data processing system, the remediation action set being based on the anomalous log segment and comprising at least one action selected from a group consisting of: (i) disabling a function of the data processing system, (ii) transferring the workload to another data processing system of the data processing systems, and (iii) disabling a hardware component of the data processing system,
 wherein obtaining the operational statistics comprises:
  identifying a time period based on a first timestamp and a second timestamp from the new log; and
  obtaining the operational statistics for the time period from an operational statistics log for the data processing system.

10. The non-transitory machine-readable medium of claim 9, wherein the operational statistics comprise:
 workload data comprising hardware performance statistics, the workload data being a part of the operational statistics log; and
 activity data comprising software performance statistics, the activity data being a part of the operational statistics log.

11. The non-transitory machine-readable medium of claim 10, wherein identifying the state comprises:
 performing a lookup based on the workload data and the activity data, the lookup returning the state.

12. The non-transitory machine-readable medium of claim 11, wherein obtaining the trained inference model comprises:
 identifying an association between the state and the trained inference model, the association being based on a previous state of the data processing system associated with training data on which the trained inference model is based.

13. The non-transitory machine-readable medium of claim 12, wherein the state and the previous state are a same state.

14. The non-transitory machine-readable medium of claim 9, wherein a presence of the anomalous log segment in the portion of the new log is treated as indicating that a future undesired operation of the data processing system is likely to occur.

15. The non-transitory machine-readable medium of claim 9, wherein the trained inference model is based exclusively on training data obtained from the data processing systems while the data processing systems were in the state.

16. A data processing system, comprising:
 a processor; and
 a memory coupled to the processor to store instructions, which when executed by the processor, cause the processor to perform operations for managing data processing systems based on indications of anomalous behaviors, the operations comprising:
 obtaining a new log for the data processing system of the data processing systems,
 obtaining operational statistics for the data processing system based on the new log, the operational statistics indicating a level of intensity of a workload of the data processing system over a period of time,
 identifying a state of the data processing system based on the operational statistics,
 obtaining a trained inference model based on the state of the data processing system,
 ingesting at least a portion of the new log to the trained inference model to obtain a classification for the new log, the classification indicating whether the portion of the new log comprises an anomalous log segment, and
 in a first instance of the classification where the new log comprises the anomalous log segment:
  executing a remediation action set to manage an impact of a potential undesired operation of the data processing system, the remediation action set being based on the anomalous log segment and comprising at least one action selected from a group consisting of: (i) disabling a function of the data processing system, (ii) transferring the workload to another data processing system of the data processing systems, and (iii) disabling a hardware component of the data processing system,
 wherein obtaining the operational statistics comprises:
  identifying a time period based on a first timestamp and a second timestamp from the new log; and
  obtaining the operational statistics for the time period from an operational statistics log for the data processing system.

17. The data processing system of claim 16, wherein the operational statistics comprise:

workload data comprising hardware performance statistics, the workload data being a part of the operational statistics log; and activity data comprising software performance statistics, the activity data being a part of the operational statistics log.

18. The data processing system of claim 17, wherein identifying the state comprises:

performing a lookup based on the workload data and the activity data, the lookup returning the state.

19. The data processing system of claim 18, wherein obtaining the trained inference model comprises:

identifying an association between the state and the trained inference model, the association being based on a previous state of the data processing system associated with training data on which the trained inference model is based.

20. The data processing system of claim 16, wherein the trained inference model is based exclusively on training data obtained from the data processing systems while the data processing systems were in the state.

\* \* \* \* \*